United States Patent [19]
Fujii et al.

[11] Patent Number: 5,542,239
[45] Date of Patent: Aug. 6, 1996

[54] METHOD FOR WELDING A PACKING BAND OF THERMOPLASTIC RESIN AND A WELDED BAND RESULTING THEREFROM

[75] Inventors: Noboru Fujii, Osaka; Kenji Kawabata, Mattou; Masaaki Hashi, Ishikawa-ken; Junji Niikura, Ishikawa-ken; Tomotoshi Ouya, Ishikawa-ken, all of Japan

[73] Assignee: Sekisui Jushi Kabushiki Kaisha, Osaka, Japan

[21] Appl. No.: 41,174

[22] Filed: Apr. 1, 1993

[30] Foreign Application Priority Data

Apr. 3, 1992 [JP] Japan ................................. 4-112070

[51] Int. Cl.⁶ ........................... B65B 13/02; B65B 51/10
[52] U.S. Cl. ........................... 53/477; 53/399; 100/2; 100/33 PB
[58] Field of Search ............................. 100/2, 33 PB, 100/29; 53/399, 477, DIG. 2, 375.9, 582, 592, 589

[56] References Cited

U.S. PATENT DOCUMENTS

| | | | |
|---|---|---|---|
| 3,316,687 | 5/1967 | Bartlett | 53/399 |
| 3,442,732 | 5/1969 | Stensaker et al. | 53/399 X |
| 3,445,307 | 5/1969 | Balamuth et al. | 100/33 PB X |
| 3,674,972 | 7/1972 | Stahnke. | |
| 4,158,711 | 6/1979 | Gould | 100/33 PB |
| 4,288,270 | 9/1981 | Mossell et al.. | |
| 4,483,438 | 11/1984 | Kobiella. | |
| 4,504,353 | 3/1985 | Ford. | |

FOREIGN PATENT DOCUMENTS

| | | | |
|---|---|---|---|
| 0416497 | 3/1991 | European Pat. Off. | 100/33 PB |
| 2571304 | 10/1984 | France. | |

*Primary Examiner*—Linda Johnson
*Attorney, Agent, or Firm*—Varndell Legal Group

[57] ABSTRACT

A packing band having a superior weld is disclosed. The band can be made of a stretched thermoplastic resin having a flat cross section. The weld is formed by overlapping ends of the band extending in the lengthwise direction thereof. The weld portion of the band includes a plurality of welded sections separated by at least one non-welded section along the lengthwise direction of the band. The welding of the packing band can be accomplished by overlapping parts of the band in a lengthwise direction thereof; melting discontinuous portions of the parts in a pattern along the length of the band parts of a melted portion, an unmelted portion and a melted portion; and then pressing the parts together so that the melted and unmelted portions of the parts contact each other and form a weld.

7 Claims, 4 Drawing Sheets

METHOD FOR WELDING A PACKING BAND OF THERMOPLASTIC RESIN AND A WELDED BAND RESULTING THEREFROM

BACKGROUND OF THE INVENTION

This invention relates to a method for welding a packing band made of a thermoplastic resin and the resulting welded packing band. More particularly, the invention relates to a method for connecting the ends of a flat band of thermoplastic resin, preferably of polyolefin or polyethylene terephthalate, in which method the band is wound around an article to be packed and both ends of the band are made molten and firmly pressed against each other to form a weld therebetween, and also to the structure of the thus connected band.

A band of thermoplastic resin is commonly used for packing various articles. The band of this kind has a flat cross section and a high tensile strength. While the band of thermoplastic resin has been used for packing corrugated cardboards for a long time, it recently has been also used for packing articles of heavy weight.

When the band of thermoplastic resin is used for packing, the band is at first wound around an article to be packed, then tightened so as not to leave any loose part or slack in the wound band, and in this state both ends of band are connected to each other. The both ends must be firmly connected so that the band will neither slip nor separate. Especially, when the band is used for packing an article of heavy weight, it is very important that the band ends are firmly attached to each other. One reason for this is that when a number of articles of heavy weight are stacked one on the other, the band packing the lower articles can be broken due to the large amount of heavy weight exerted thereon, resulting in collapse of the articles.

In the prior an clasps have been used for connecting the band. However, when it is considered that the band ends made of thermoplastic resin can be firmly connected together by heating to form a weld therebetween, connecting the ends of the band by heating and welding is practical for thermoplastic bands. When the band of a thermoplastic resin (hereinafter referred to as a "band") has been connected at both ends thereof, various methods for welding the band have been employed. The method for welding the band is classified depending on particular process used for melting the thermoplastic resin constituting the band. The processes for melting the resin can include a process using a heating plate, a process using frictional heat, and a process using ultrasonic waves.

When an article of heavy weight is packed with the band, no matter whatever method is used for welding the band, it is difficult to obtain a welded part of the band having a strength of more than 60% of the strength of the band itself prior to welding. More particularly, when a band having a tensile strength of more than 300kg/cm$^2$ is used for packing an article and such a band is welded for packing, the resulting welded part has a tensile strength only within the range 30–60% of that of the band itself prior to welding. Thus, the resulting welded band is not suitable for packing articles of heavy weight, even though the band itself has a great tensile strength.

When the band is connected by welding, the welding has previously been conducted in manner such that the welded portion forms a single continuous area on the band which extends in the lengthwise direction of the band. When it is desired to increase the strength of the welded part, it has been common practice to increase the area of the welded part of the band. In this case, when viewed from the widthwise direction of the band (the transverse direction relative to the length of the band), it has also been practiced to weld the band over its entire width, namely, completely from one side to the other. Thus, in order to increase the strength of welded part of the band, the welded part has only been extended in the lengthwise direction of the band in a manner such that the welded part forms a single continuous area.

SUMMARY OF THE INVENTION

The present invention is directed to a method of welding a packing band and the resulting welded packing band. In the method, two end parts of a thermoplastic band having a flat cross section are overlapped. Thereafter, the surfaces of the overlapped ends of the band which contact each other, or which are to contact each other, are made molten by heating, and then the molten parts are pressed together to weld the ends of the band together. The method is characterized in that when the surfaces of the overlapped portions of the bands are heated, a plurality of molten portions are provided so that there is at least one unmolten portion between the molten portions in the lengthwise direction of the band. During pressing, the molten portions of the overlapped ends of the band are pressed together so that the corresponding molten portions of the two ends bond to each other and the unmolten portion(s) are simply pressed together. The melting of the surfaces of the overlapped band ends can be achieved by the use of a heating plate interposed between the contacting surfaces for melting them. Alternatively, a vibrating plate can be utilized to vibrate portions of the contacting surfaces so that they become molten.

The present invention is also directed to the welded band resulting from the aforesaid method. The welded portion of the band has a plurality of welded portions which are separated by at least one non-welded portion, and the welded and non-welded portions are in close proximity of each other, so that the ends of the band are welded intermittently along the overlapped portion of the band ends.

DETAILED DESCRIPTION OF THE PREFERRED EMBODIMENTS

Figure 1A:
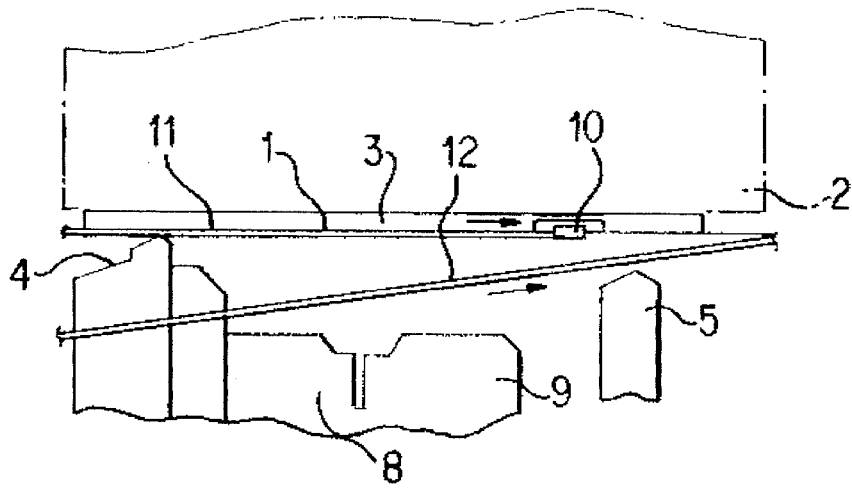
FIGS. 1A, 1B, 1C, 1D, 1E, 1F and 1G, show a schematic view of a method of the present invention.

The inventors desired to obtain a connected part of a packing band made by welding which has a strength greater than that in the prior art. For this purpose, the inventors at first tried to increase the area of the welded part in accordance with the conventional manner. The inventors, however, found that it was difficult to increase the strength of the welded part to more than 65% of the strength of the band itself prior to welding, even if the welded part was extended greatly in the lengthwise direction of the band. In particular, the inventors found that the strength of the welded part could initially be increased as the welded part was extended in the lengthwise direction of the band. However, the increasing rate in the strength of the welded part by extending the weld in the lengthwise direction gradually decreased, and the strength of the welded part could not be increased after the length of the welded part had reached a certain value. For example, in case of the band commonly used for packing articles of heavy weight, there was no increase in the strength of the welded part after the length of the welded part reached 2–3 times width of the band. Thus, the inventors discovered that the strength of the welded part cannot be greatly increased by extending the area of the welded part.

The inventors welded bands in various ways and measured the tensile strength of the welded parts of the bands. The inventors closely examined the surfaces where the breakage occurred when the tensile strength was measured. Based on this study, the inventors have found that the break in the band does not occur at the original surface of the band but occurs primarily at the border between the molten part and unmolten part in the welded portion of the band. This was caused by the fact that the molten portion of the band after welding has a molecular structure different from that of the band itself prior to welding, and the breakage occurred in the boundary between the molten portion and unmolten portion. The resin molecules are highly oriented in the band itself before welding because the band was subjected to high stretching when it was produced. However, the resin molecules in the molten portion are not oriented, because the original molecular orientation of the band is destroyed when it is melted. Thus, it was discovered that the prior art attempts to improve the weld strength, especially by increasing the welded area in the lengthwise direction of the band, are not effective.

Furthermore, the inventors studied in detail the band surfaces formed by breakage when the welded band was pulled and broken. As the result, the inventors found that both ends of the welded portion in the lengthwise direction of the band contribute greatly to the strength of the welded portion. However, the inventors found that the intermediate area in the welded portion does not contribute significantly to the weld strength of the band. For such reasons, it was understood why the increase of the area in the welded portion did not bring about an increase in the weld strength of the band as mentioned above.

The inventors then prepared two kinds of the band connections having the same total welded area, one having two or more separate welded portions in the lengthwise direction of the band, the other having a single welded portion, and these welded bands were tested by measuring the weld strength (welded tensile strength). As the result, the inventors confirmed that the band connections having plural welded portions have a higher weld strength than those having a single welded portion. The present invention has been completed on the basis of the above findings.

The present invention includes a method which comprises overlapping two parts of a band so as to contact a surface of one of the parts with a surface of the other. The parts of the band are overlapped in a lengthwise direction so that they are aligned about their widths. A heating plate can be then interposed between the band parts, and the contacting surfaces of the band parts can be melted. Thereafter, the heating plate is removed, and the overlapped parts are pressed from outside (by their non-contacting surfaces) to weld them together. It is important that a plurality of heating portions are provided on the heating plate because it is advantageous to form a plurality of molten portions on each of the contacting surfaces and to leave at least one unmolten portion between the molten portions in the lengthwise direction of the band; so that after the pressing of the contacting surfaces together, plural welded portions are formed with at least one non-welded portion between the welded portions in the lengthwise direction.

While the use of a heating plate has been described above for melting or providing a plurality of molten portions on each of the contacting surfaces, arty means for heating the contacting surfaces of the band so as to provide the plurality of molten portions can be used, such as those used in the prior art used to provide a single molten portion. This can include the use of frictional heat or the use of heat generated by ultrasonic waves. The use of frictional heat such as that provided by a vibrating plate can be implemented by a method comprising overlapping parts of the band to contact a surface of one of the parts with a surface of the other in the same manner as described above, pressing a vibrating plate on one of the parts while the contacting surfaces are in close contact so as to generate frictional heat between the contacting surfaces to, melt them, and then stopping the vibration so that the molten surfaces can weld to each other. It is important that a plurality of vibrating portions are provided on the vibrating plate so that a plurality of molten portions are formed on each of the contacting surfaces and that at least one unmolten portion remains between the molten portions in the lengthwise direction of the band. With this arrangement, alter the vibration is stopped, a plurality welded portions are formed in the lengthwise direction with at least one non-welded portion between the welded portions in the lengthwise direction.

The invention also includes the welded band resulting from the above-described method which is characterized by a particular arrangement of the welding of the overlapped parts of the band. Namely, the end parts of the band are overlapped with each other so as to contact a widthwise surface of one of the parts with a widthwise surface of another part along the length of the overlapped parts, and a weld is formed between the contacting surfaces of the overlapped parts. The weld has at least two welded portions located apart and separated by at least one non-welded portion. The welded portions and the non-weld portions are contiguous. The welded portions are arranged close to each other so that the non-welded portion separating the neighboring welded portions is of a length within the range from the band thickness to two times the band width in the lengthwise direction of the band.

The band which can be used in the invention can be made of a thermoplastic resin and is an elongated article having a flat cross section. As the thermoplastic resin material any of the various thermoplastic resins can be used, such as polyolefin, polyester and polyamide. As the polyolefin use can be made of polyethylene and polypropylene, as the polyester use can be made of polyethylene terephthalate, and as the polyamide use can be made of 6-nylon and 6,6-nylon. Among them, the band of polypropylene is preferred. A flat cross section as used herein means a band with a cross section having a width greater than 15 times, preferably 20 times, the thickness of the band. The width is generally within the range of 5–35 mm. The wide, flat surfaces are sometime smooth but are often embossed to have many small protuberances and recesses distributed alternately on the entire surfaces in order to prevent the band from slipping.

The band is prepared by extruding the thermoplastic resin into an extrudate having a flat cross section, then the extrudate is stretched to more than five times its original extruded length in the extruding (or lengthwise) direction so that the resin molecules oriented in the lengthwise direction, which imparts the resulting band with a high strength in its lengthwise direction. This results with the band having high tensile strength. For this reason the band occasionally has the disadvantage of a tendency to split in the lengthwise direction.

In order to connect one (first) part of the band with another (second) part of the band, both the first and second parts must be simultaneously heated so as to melt only the surface portions of the band. The reason for this is that, when the band is heated and molten, the molecules in the molten portion lose their orientation as mentioned above, resulting in the molten portion losing its tensile strength. The heating of the band, therefore, is preferably carried out either by heat conduction from the band surface using a heating plate or by frictional heat generated by rubbing the band surfaces together.

Figure 1B:
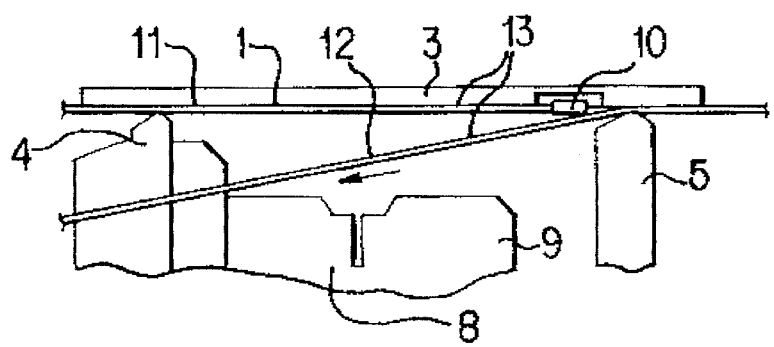
Figure 1C:
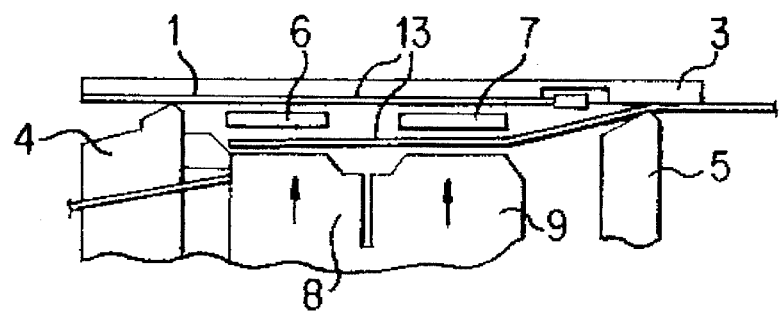
Figure 1D:
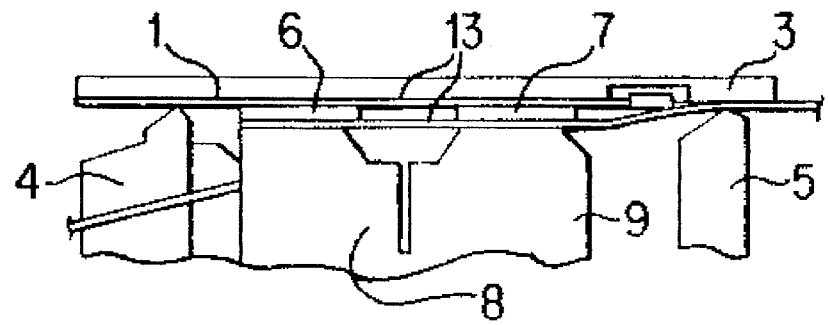
Figure 1E:
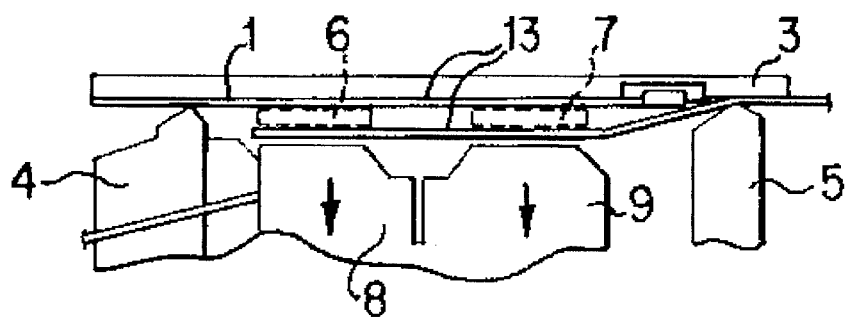
Figure 1F:
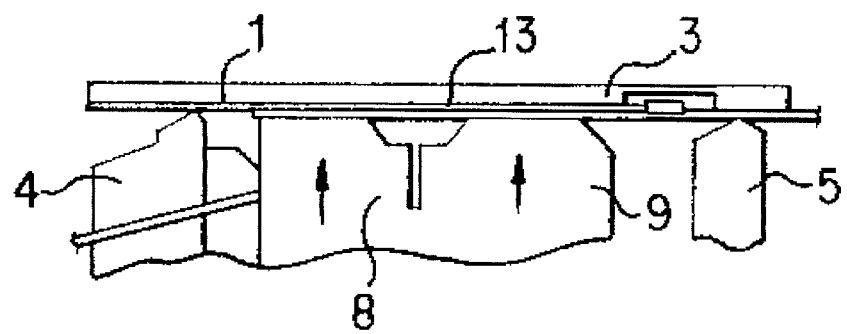
Figure 1G:
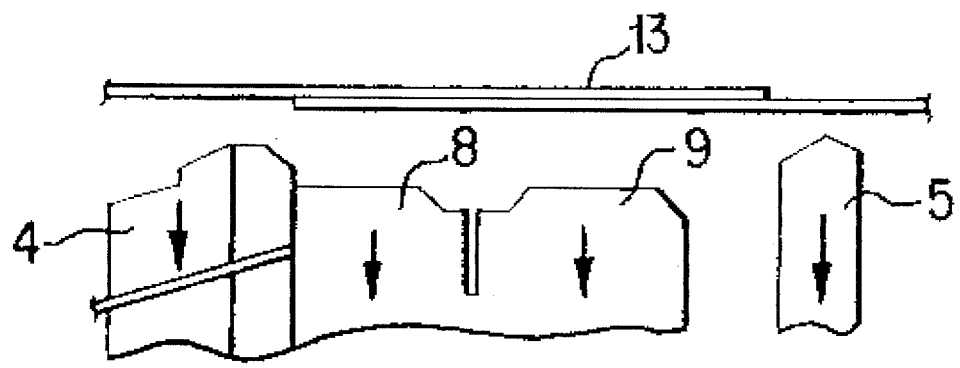
Figure 2:
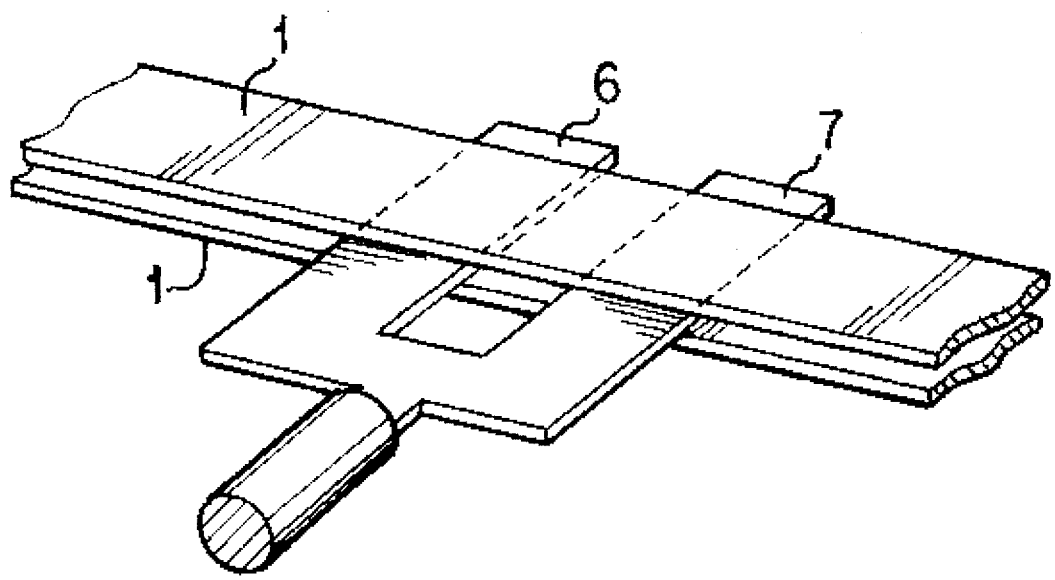
FIG. 2 is a perspective view of an example of the heating plate as shown in FIGS. 1A through 1G.
Figure 3:
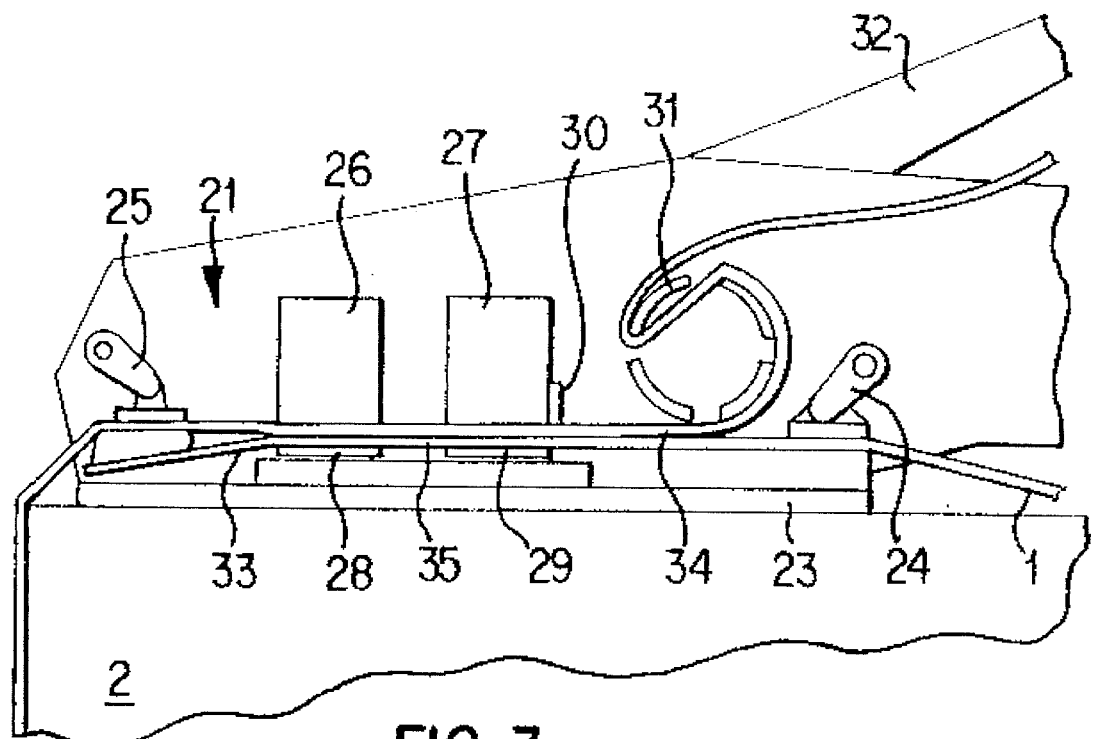
FIG. 3 is a schematic view of a method in which the band is welded by use of two vibrating plates.
Figure 4:
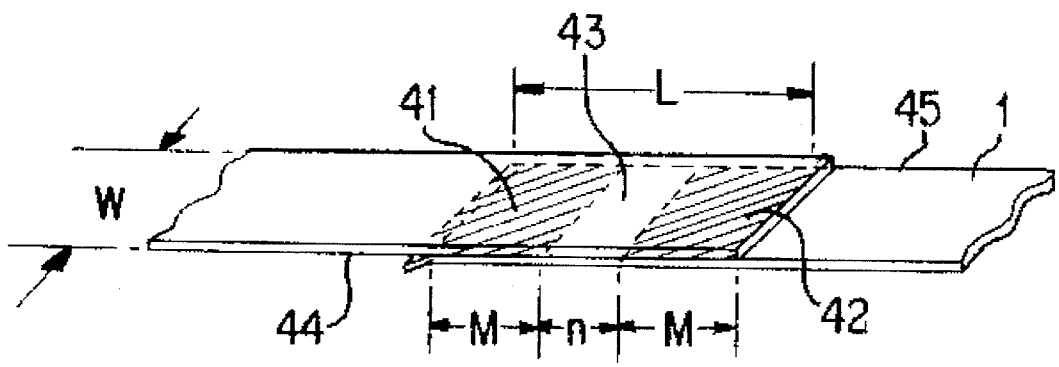
FIG. 4 is a perspective view of a welded band according to the present invention.

The invention is explained below by way of Examples referring to the accompanying drawings, in which FIGS. 1A through 1G show a schematic view of a method in which the band is welded by means of a heating plate, FIG. 2 is an oblique view of an example of the heating plate as shown in FIG. 1, FIG. 3 is a schematic view of a method in which the band is welded by means of two vibrating plates, and FIG. 4 is an oblique view of the welded band according to the present invention.

In FIGS. 1A through 1G, reference numeral 1 denotes a packing band of polypropylene, and 2 an article to be packed. Reference numerals references 3–10 denote various members of a welding apparatus. Among these members, reference numeral 3 denotes a sliding table, 4 a first holding means, 5 a second holding means, 6 and 7 a heating plate, 8 and 9 a pressing member, and 10 a limit switch. The heating plates 6 and 7 are separately made and located at a certain distance apart. The pressing members 8 and 9 are also separately made and located at position corresponding to the heating plates 6 and 7, respectively. Other than explained here, the welding apparatus can operate in the same manner as the conventional welding apparatus.

FIGS. 1A to 1G show a method in which the band is welded as follows. The article 2 to be packed is placed on a stand not shown in FIG. 1A. Band 1 is wound around the article 2, tightened by pulling both ends in opposite directions, and the both ends are overlapped under the article 2. More particularly, as shown in FIG. 1A, at first, when the forward end of the band 1 contacts with the limit switch 10, the first holding means 4 is elevated to press the forward (or first) part 11 of the band up to the sliding table 3 and the forward part 11 is secured by the first holding means 4. Then the second holding means 5 is elevated, as shown in FIG. 1B, and the pulled (or second) part 12 of the band is secured by the second holding means 5 and the sliding table 3. At this time, both the forward part 11 and pulled part 12 of the band are overlapped to contact the wide surface of the pulled part with the wide surface of the forward part and to form a double (or overlapped) part 13.

Thereafter healing plates 6 and 7 are interposed into the double part 13 as shown in FIG. 1C, and then the pressing means 8 and 9 are elevated to cut the pulled part of the band. Subsequently, as shown in FIG. 1D, the pressing means 8 and 9 are further elevated to press the double part 13 up to sliding table 3 and then to melt the mutually facing surfaces in the double part by heat conduction from heating plates 6 and 7. At this time, heating plate 6 is separated from heating plate 7 and an unheated part is formed between heating plates 6 and 7. Thus, plural molten portions separated in the lengthwise direction of the band are formed on the mutually facing surfaces in the double parts, and a non-molten portion is present between the molten portions. In this instance, both heating plates 6, 7 and pressing means 8, 9 are separated from each other.

When a surface portion of each of the mutually facing surface is molten by heating plates 6 and 7, pressing means 8 and 9 are lowered as shown in FIG. 1E, and then heating plates 6 and 7 are removed from the double parts of the band. Subsequently, as shown in FIG. 1F, pressing means 8 and 9 are elevated again to press the double parts up against sliding table 3. Then the molten portions are welded but the non-molten portions are not welded and remain simply in close contact with each other. Thereafter, as shown In FIG. 1G, the pressing means 8 and 9 are lowered, first holding means 4 and second holding means 5 are also lowered, the sliding table 3 is withdrawn, and thereby the welding of the packing band is completed.

In FIGS. 1A and 1G, heating plate 6 is made separately from heating plate 7, but both heating plates 6 and 7 can be made in one body, as shown in FIG. 2, in such a manner that they are united in the bottom portion thereof but separated in the head portion thereof. Pressing means 8 and 9 are made separately each other in FIGS. 1A to 1G, however, they can be made in one body. In this case, the pressing means should have a recessed portion corresponding to the non-welded portion of the band.

FIG. 3 shows a method for welding the band by using frictional heat, and parts therein are as follows. Reference numeral 1 denotes a packing band of polypropylene, 2 denotes an article to be packed. Reference numeral 21 denotes a manual welding apparatus, which is mounted on the article 2. Reference numerals 23–32 denote parts of the welding apparatus 21. Among them, reference numeral 23 denotes a chassis of the apparatus, 24 the first holding means, 25 the second holding means, 26 and 27 sealing heads, 28 and 29 vibrating plates, 30 a cutter, 31 a tightening reel, and 32 a handle. The sealing head 26 is made separately from the sealing head 27, and both sealing heads are arranged at a distance along the lengthwise direction of the band. Vibrating plates 28 and 29 are also arranged at the same distance in the lengthwise direction of the band corresponding respectively to the sealing heads 26 and 27. In other respects, the welding apparatus has the same parts as those in the welding apparatus stated above, and acts in the same manner as stated above.

The particulars of the welding process shown in FIG. 3 are as follows. At first, welding apparatus 21 is mounted on an article 2 to be packed, band 1 is wound around the article 2, then band 1 is tightened, and both ends of the band 1 are overlapped above the article 2. At this time, forward (or first) part 33 of the band 1 is passed between vibrating plates 28, 29 and sealing heads 26, 27, and then passed under the first holding means 24. On other hand, a tightening (or second) part 34 of the band 1 is passed under the second holding means 25, placed above the forward part 33 of the band 1, and passed between the sealing heads 26, 27 and vibrating plates 28, 29, and then fixed to a tightening reel 31. Thus, an overlapping part 35 of the band 1 is formed between the forward part 33 and the tightening part 34 of the band 1.

In this state, the first holding means 24 is rotated and the forward part 33 is secured between the first holding means 24 and the chassis 23. Handle 32 is operated to rotate the tightening reel 31, thereby pulling the tightening part 34 to further tighten the band 1. In this state the second holding means 25 is further rotated, and the tightening part 34 is secured between the second holding means 25 and the chassis 23. Subsequently, the sealing heads 26 and 27 are lowered, and the overlapping part 35 of the band 1 is pinched between the sealing heads 26, 27 and the vibrating plates 28, 29.

While the band 1 is being pressed by the sealing heads 26 and 27, the vibrating plates 28 and 29 are vibrated along the overlapped surfaces. Vibration along the overlapped surfaces means that the band 1 is vibrated either in the lengthwise direction or widthwise direction of the band itself. The vibration is carried out, for example, by reciprocating the band where the sealing head is located at a rate within the range of 10,000–30,000 rpm. When such vibration is carried out for 1–10 seconds, the opposing or facing surfaces in the overlapped parts become molten by frictional heat at the portions wherein the vibrating plates 28 and 29 are opposed to the sealing heads 26 and 27. When vibration of the vibrating plates 28 and 29 is stopped and the opposing parts of the band are cooled while being pressed, the opposing parts are welded to each other at the molten portions. Thus, the welding of the packing band is completed.

The vibrating plates 28 can be made separately from the vibrating plate 29, but both plates can be made in one block. When both plates are made in one block, a groove should be formed on the block so that the opposing parts are partly prevented from contacting each other and an unmolten portion can be formed at the groove. The vibrating plates are preferably vibrated in the widthwise direction of the band, and it is sufficient to move the vibrating plates at a distance of about 1 mm.

The connecting (or welded) portion of the band obtained by the welding methods shown in FIG. 1 and 3 has a structure as shown in FIG. 4. In FIG. 4, the welded portions are indicated by hatching. The welded portions 41 and 42 are separated in the lengthwise direction of the band, and an unwelded portion 43 exists between the welded portions 41 and 42. The welded portions 41 and 42 extend through the entire width of the band, and the unwelded portion 43 also extends through the entire width of the band 1.

The length n of the unwelded portion 43 in the lengthwise direction of the band 1 is more than the thickness of the band 1, and less than twice the width W of the band 1, preferably less than the width W. The existence of the unwelded portion 43 has never been seen in the conventional connecting or welded of parts of the band.

The unwelded portion 43 can be easily seen from the outside of the band. As the result of having been welded, the welded portion has an increased width due to protrusion of the molten resin on both sides 44 and 45 of the band. The welded portion also has a slightly decreased thickness at the welded portion 41 and 43. However, at the unwelded portion 43 the band maintains its original width and no protrusion due to molten resin can be seen on both sides 44 and 45.

FIG. 4 shows the band having two welded portions, however, the number of welded portions is not limited to two, and there can be three or more. In the case of two welded portions, the weld shows a considerable improvement in weld strength compared with a case of a single welded portion. In case of three or more welded portions, a considerable improvement in weld strength compared with the case of two welded portions is not achieved. Moreover, it is not necessary that the welded portions have the same area. In other words, they can have different areas. Also, it is not necessary that the welded portions have a rectangular shape, and they can be of any shape such as a parallelogram.

Referring to the band shown in FIG. 4, it is preferable that the band has the following numerical ranges: $40 \geq M \geq 5$ mm, $40 \geq n \geq 1$ mm, and $11 \leq L \leq 200$ mm. The reasons for this are that it is not easy to form the length of the welded portions M in a length exceeding 40 mm and conversely if M is less than 5 mm, then the welded area is decreased and the welded strength tends to decrease. If n exceeds 40 mm, the doubled or overlapped part is liable to become loose or slacken and the parts are not in close contact. Conversely if n is less than 1 mm, then the neighboring welded portions are too close to each other, and it becomes difficult to provide the unwelded portion between them and achieve the advantages provided thereby. If L is less than 11 mm, then the weld strength becomes insufficient. On the other hand, if L is more than 200 mm, no increase or improvement in the weld strength can be expected, and further it becomes difficult to operate the heating of the band.

According to the present invention, the band connection as shown in FIG. 4 can be obtained by one treatment, where a plurality of welded portions are formed separated by an unwelded portion(s) in the lengthwise direction of the band. The band connection shown in FIG. 4 has the advantage that it has a greater weld strength compared with the conventional connection having a single welded portion which results from the plural welded portions being separated by the unwelded portion(s). The band, therefore, can be firmly secured and accordingly can be safely used for packing articles of heavy weight, resulting in increased usefulness of the band. In this respect the present invention brings about great advantages.

It is quite unexpected from the prior art that the weld strength of a packing band can be increased by the presence of the unwelded portion 43, as shown in FIG. 4, compared with the case wherein the unwelded portion 43 is not present. This advantage of the present invention is explained below by reference to examples. However, the following examples in no way limit the present invention and are only exemplary. In the following examples the weld strength given is an average value of the results obtained with ten test samples. Below weld strength means tensile weld strength in the lengthwise direction of the band.

EXAMPLE 1

A band of stretched polypropylene was used having a flat cross section, a width of 19 mm, a thickness of 1 mm, wide surfaces with regular ruggedness, and strength of 931 kg. A welding apparatus was used having a structure as shown in FIGS. 1A through 1G. The welding apparatus has a heating plate which extended over the entire width of the band in the width direction and which had two heating portions, each having the length of 20 mm, and a non-heating portion having the length of 10 mm between the heating portions in the lengthwise direction of the band. The heating portions were heated at 280° C., contacted with the band for 0.8 second, and thus heated only the surface portions of the band parts 11 and 12 which face each other. Thus, the band was heated so as to form the arrangement shown with reference to FIG. 4 in that two molten portions were formed, each having the length M of 20 mm in the lengthwise direction of the band and an unmolten portion having the length n of 10 mm between the two molten portions.

After the molten portions had been formed, the heating plate was removed, and the molten portions were pressed together and cooled. At this time, the total pressure was maintained at 167 kg and pressing time was for two seconds. After having been pressed and cooled, the molten portions were welded to each other and two welded portions were formed each having the length of 20 mm. Thus, a total welded area of 7.6 cm² was formed. A pressing strength of 22 kg/cm² was applied to the band while it was being cooled.

Thus, the welded portion of the band extended 50 mm in the lengthwise direction of the band. When the weld strength of the band was measured, it was 624 kg. This weld strength was excellent, compared with the conventional weld strength of approximately 500 kg in the band generally having the weld area of approximately 7.6 cm².

EXAMPLE 2

This Example was carried out in the same manner as in Example 1, except that the heating plate and the pressing means were changed. The heating plate used in this Example had three heating portions, each of which had the length of 13.3 mm, and had two non-heating portions of 5 mm in length contiguously arranged between the heating portions. The pressing means had three pressing portions, respectively corresponding to each of the heating portions. Thus, three molten portions were formed on the band each having the length M of 13.3 mm, and two unmolten portions having the length n of 5 mm between the neighboring molten portions. In other respects the band was treated in the same manner as in Example 1 and a welded band was obtained. As the result, the welded band had three welded portions each separated from the next welded portion by a non-welded portion. In total, the welded and non-welded portions extended within a range of 50 mm in the lengthwise direction. The welded band can be expressed to have a weld pattern of 13.3+(5)+13.3+(5)+13.3, where the numbers not in parentheses represent welded lengths and those in parentheses represent non-welded lengths.

The welded band had the weld strength of 618 kg which was excellent.

Comparative Example 1

This Comparative Example was carried out in the same manner as in Example 1, except that the heating plate and the pressing means were changed. The heating plate used here had a single heating portion of 50 mm in length extending in the lengthwise direction of the band. The pressing means had a single pressing portion corresponding to the single heating portion. In order to equalize the pressing strength to that in Example 1, a pressure in the total amount of 209 kg was exerted on the overlapped parts portion of the band by the pressing means. In other respects the band was treated in the same manner as in Example 1. As the result, a band was obtained which had a single welded portion of 50 mm in length in the lengthwise direction of the band. That is, there was not a non-welded portion between welded portions as in the present invention.

The weld strength of the band was measured, and it was found that the weld strength was 481 kg.

Comparative Example 2

This Comparative Example was carried out in the same manner as in Example 1, except that the heating plate and the pressing means were changed. The heating plate used in this Comparative Example had a single heating portion of 40 mm in length in the lengthwise direction of the band. The pressing means had a single pressing portion corresponding to the single heating portion. As the result, the band was obtained which had a single welded portion of 40 mm in length in the lengthwise direction of the band.

The weld strength of the band was measured and it was found that the weld strength was 460 kg.

The results obtained above and pressing conditions are listed in Table 1 below.

TABLE 1

| | WELD PATTERN Figures in parentheses show length of non-welded portion mm | WELDED PORTION | | PRESSURE | | |
|---|---|---|---|---|---|---|
| | | TOTAL LENGTH mm | WELDED AREA cm² | TOTAL PRESSURE kg | PRESSING STRENGTH kg/cm² | WELD STRENGTH kg |
| EX. 1 | 20 + (10) + 20 | 50 | 7.6 | 167 | 22 | 624 |
| EX. 2 | 13.3 + (5) + 13.3 + (5) + 13.3 | 50 | 7.6 | 167 | 22 | 618 |
| COMP. EX. 1 | 50 | 50 | 9.5 | 209 | 22 | 481 |
| COMP. EX. 2 | 40 | 40 | 7.6 | 167 | 22 | 460 |

When the data in Table 1, is compared, it is readily apparent that the bands with plural welded portions obtained in the above Examples have an unexpected superior weld strength relative to the bands with a single welded portion obtained in the above Comparative Examples.

EXAMPLE 3

Example 3 and the subsequent Examples were carried out by welding with frictional heat. A band was used which was made of stretched polypropylene, which had a width of 32 mm, a thickness of 0.9 mm, surfaces with a large number of small protuberances and recesses, and a strength of 1252 kg in itself.

In Example 3, the apparatus as shown in FIG. 3 was used for generating the frictional heat. Two vibrating plates 28 and 29, each of which had a length of 16 mm in the lengthwise direction of the band, were located at a distance of 8 mm apart. The vibrating plates were operated to make 17300 reciprocations per minute with an amplitude of 1 mm for 1.5 seconds to generate frictional heat between the opposing surfaces of the band. Thus two molten portions, each of which had the area of 16 mm X 32 mm (total area 10.2 cm²), were formed at a distance of 8 mm apart, namely, an unmolten portion having the area of 8 mm X 32 mm.

Immediately after the vibration had been stopped, the band was cooled and thus welded. In this instance, sealing heads 26 and 27 were made separately having a size corresponding to the independent vibrating plates 28 and 29, respectively, and each of the sealing heads were pressed with the pressure of 45 kg, thereby totally 90 kg. Thus, the pressing strength was 8.8 kg/cm$^2$.

The thus welded band was tested for measuring the weld strength, and it had a weld strength of 879 kg.

EXAMPLE 4

This Example was carried out in the same manner as in Example 3, except that the vibrating plates, and sealing heads were changed and total pressure of the sealing heads was also changed so as to equal the pressing strength used in Example 3. Three vibrating plates and three sealing heads were used so as to form three molten portions of 10 mm in length in the lengthwise direction of the band with a distance therebetween of 5 mm, and hence the total area of the molten portions were 9.6 cm$^2$. The sealing heads were pressed by a total pressure of 84.5 kg, and accordingly by the pressing strength of 8.8 kg/cm$^2$, which was equal to the pressing strength in Example 3.

The resulting band had a weld strength of 868 kg.

EXAMPLE 5

This Example was carried out in the same manner as in Example 3, except that the vibrating plates and sealing heads were changed, and total pressure of the sealing heads was also changed so that the pressing strength by the sealing heads was equal to that used in Example 3. In this Example, two vibrating plates were used, each of which had a length of 15 mm in the lengthwise direction of the band, and which were located at a distance of 2 mm apart in the lengthwise direction of the band. The total pressure by the sealing heads was 84.5 kg, and hence the pressing strength was 8.8 kg/cm$^2$, which was equal to that used in Example 3.

As the result, the band had two welded portions of 15 mm in length in the lengthwise direction of the band, and a non-welded portion of 2 mm in length between the two welded portions. The welded band had a weld strength of 853 kg.

Comparative Example 3

This Comparative Example was carried out in the same manner as in Example 3, except that the vibrating plates and sealing head were changed. In particular, only one of two vibrating plates used in Example 3 was used in this Comparative Example, and the total pressure applied to the sealing head was reduced to half, namely, to 45 kg, so the pressing strength was equal to that used in Example 3. In other respects, the Comparative Example was carried out in the same manner as in Example 3.

The resulting band had a single welded portion of 16 mm in length in the lengthwise direction of the band and a weld strength of 561 kg.

Comparative Example 4

This comparative Example was carried out in the same manner as in Example 3, except that the vibrating plates and the sealing heads were changed. Particularly, the two vibrating plates used in Example 3 were connected into one block so as to eliminate a gap between the vibrating plates, and the two sealing heads were also connected into one block so as to correspond to the vibrating plates. In other respects, the band was welded in the same manner as in Example 3.

The resulting band had only one welded portion of 32 mm in length in the lengthwise direction of the band with a weld strength of 722 kg.

Comparative Example 5

This Comparative Example was carried out in the same manner as in Example 3, except that the vibrating plates and the sealing heads were changed. Particularly, use was made of only one vibrating plate having the length of 40 mm in the lengthwise direction of the band, and use was made of a single sealing, head corresponding to the vibrating plate. The total pressure applied to the sealing head was 112.6 kg to provide a pressing strength equal to that used in Example 3. The other procedures were carried out in the same manner as in Example 3.

The resulting band had a single welded portion of 40 mm in length in the lengthwise direction of the band with a weld strength of 756 kg.

Above-mentioned matters stated after Example 3 are listed in the following Table 2.

TABLE 2

| | WELD PATTERN Figures in parentheses show length of non-welded portion mm | WELDED PORTION | | PRESSURE | | |
| --- | --- | --- | --- | --- | --- | --- |
| | | TOTAL LENGTH mm | WELDED AREA cm$^2$ | TOTAL PRESSURE kg | PRESSING STRENGTH kg/cm$^2$ | WELD STRENGTH kg |
| EX. 3 | 16 + (8) + 16 | 40 | 10.2 | 90 | 8.8 | 879 |
| EX. 4 | 10 + (5) + 10 + (5) + 10 | 40 | 9.6 | 84.5 | 8.8 | 868 |
| EX. 5 | 15 + (2) + 15 | 32 | 9.6 | 84.5 | 8.8 | 853 |
| COMP. EX. 3 | 16 | 16 | 5.1 | 45 | 8.8 | 561 |
| COMP. EX. 4 | 32 | 32 | 10.2 | 90 | 8.8 | 722 |
| COMP. EX. 5 | 40 | 40 | 12.8 | 112.6 | 8.8 | 756 |

When data in Table 2 is compared, it is apparent that the bands having plural welded portions with a non-welded portion therebetween obtained in the above Examples, according to the present invention, have a superior weld strength relative to the bands with a single welded portion obtained in the above Comparative Examples.

EXAMPLE 6

In this Example a band of stretched polypropylene was used having a width of 31 mm, a thickness of 0.97 mm and a strength of 1320 kg in itself, and two molten portions in the lengthwise direction of the band were formed on the surface of the band by rubbing together the surfaces to leave an unmolten portion of 8 mm in length between the molten portions. The molten portions were pressed by sealing heads under varying pressures to form welded bands all having a weld pattern of 16+(8)+16. More particularly, the pressure was varied so as to give a pressing strength of 10, 15, 20, 25, 30 or 34 kg/cm$^2$. Using the thus obtained welded bands the weld strength of the band was measured, and the results listed in Table 3 were obtained.

TABLE 3

| PRESSURE | | WELDED PORTIONS | | |
|---|---|---|---|---|
| PRESSING STRENGTH kg/cm$^2$ | TOTAL PRESSURE kg | TOTAL LENGTH mm | WELDED AREA cm$^2$ | WELD STRENGTH kg |
| 10 | 99.2 | 32 | 9.9 | 889 |
| 15 | 148.8 | 32 | 9.9 | 940 |
| 20 | 198.4 | 32 | 9.9 | 956 |
| 25 | 248.0 | 32 | 9.9 | 941 |
| 30 | 297.0 | 32 | 9.9 | 887 |
| 34 | 337.3 | 32 | 9.9 | 667 |

When data in Table 3 is reviewed, it is seen that when the pressing strength is less than 20 kg/cm$^2$, the weld strength is increased as the pressing strength is increased. However, when the pressing strength is more than 20 kg/cm$^2$, the weld strength is not increased, but rather is slightly decreased as the pressing strength is increased. In the case where pressing strength is more than 30 kg/cm$^2$, the weld strength is considerably decreased.

Accordingly, in case of the polypropylene band, the pressing strength should preferably be less than 30 kg/cm$^2$.

EXAMPLE 7

In this Example, a flat band of stretched polyethylene terephthalate was used having a width of 31 mm, a thickness of 0.84 mm, a regularly rugged pattern on its surfaces and a strength of 1054 kg in itself. The surfaces of the band were partly molten by contacting a heating plate in the same manner as in Example 1. The heating plate had two heating portions, each of which had a length of 20 mm in the lengthwise direction of the band and between which was formed a nonheating portion having a length of 10 mm. The heating plate was heated at 430° C., contacted with the band for 0.3 seconds, and thus heated only a surface portion of the band.

Thus, two molten portions were formed on the band each having a length of 20 mm in the lengthwise direction of band and a non-molten portion interposed between the two molten portions having a length of 10 mm between the molten portions. Subsequently the heating plate was removed from the band, and the molten portions were pressed and cooled. At this time the total pressure was maintained at 273 kg and pressing time was two seconds. After having been pressed, the molten portions were welded together and there were formed welded portions forming a weld pattern of 20+(10)+20.

The weld strength of the resulting band was measured and found to be 920 kg.

EXAMPLE 8

This Example was carried out in the same manner as in Example 7, except that the heating plate and the pressing means were changed. The heating plate and the pressing means used here were the same as those used in Example 2. In particular, the heating plate had three heating portions, each having a length of 13.3 mm in the lengthwise direction of the band, and had two non-heating portions having a length of 5 mm between the neighboring heating portions. The pressing means used had three separate pressing portions, each of which corresponded to one of the said heating portions. In other respects, the band was treated in the same manner as in Example 7 and welded to form a weld pattern of 13.3+(5)+13.3+(5)+13.3.

The weld strength of thus welded band was measured and found to be 915 kg.

Comparative Example 6

This Comparative Example was carried out in the same manner as in Example 7, except that the heating plate and pressing means were changed. The heating plate and pressing means used here were the same as those used in Comparative Example 1. In particular, the heating plate had a single heating portion of 50 mm in length in the lengthwise direction of the band, and the pressing means had also a single pressing portion corresponding to the single heating portion. In order to equalize the pressing strength to that in Example 7, a total pressure of 341 kg was applied by the pressing means. As the result, the band was welded to have a weld pattern of 50, which did not include any non-welded portion in the welded portion.

The weld strength of thus welded band was measured and found to be 789 kg.

Comparative Example 7

This Comparative Example was carried out in the same manner as in Example 7, except that the heating plate and pressing means were changed. The heating plate and pressing means used here were the same as those used in Comparative Example 2. In particular, the heating plate had a single heating portion of 40 mm in length in the lengthwise direction of the band, and the pressing means had also a single pressing portion corresponding to the single heating portion. In other respects, the band was treated in the same manner as in Example 7 to form a weld pattern of 40.

The weld strength of thus welded band was measured and found to be 773 kg.

The results obtained in Examples 7 and 8 and Comparative Examples 6 and 7 are listed in Table 4.

TABLE 4

| WELD PATTERN Figures in parentheses show length of non-welded portion mm | WELDED PORTION | | PRESSURE | | WELD STRENGTH kg |
| --- | --- | --- | --- | --- | --- |
| | TOTAL LENGTH mm | WELDED AREA cm² | TOTAL PRESSURE kg | PRESSING STRENGTH kg/cm² | |
| EX. 7 | 20 + (10) + 20 | 50 | 12.4 | 273 | 22 | 920 |
| EX. 8 | 13.3 + (5) + 13.3 + (5) + 13.3 | 50 | 12.4 | 273 | 22 | 915 |
| COMP. Ex. 6 | 50 | 50 | 15.5 | 341 | 22 | 789 |
| COMP. EX. 7 | 40 | 40 | 12.4 | 273 | 22 | 773 |

When data in Table 4 are reviewed, it is seen that even in case wherein the bands are made of stretched polyethylene terephthalate, the bands with plural welded portions obtained in Examples 7 and 8 have superior weld strengths to the bands with a single welded portion obtained in Comparative Examples 6 and 7.

What is claimed is:

1. A method for welding a packing band of stretched thermoplastic resin having a flat cross section which comprises the steps of:

overlapping a first part and second part of the band in a lengthwise direction thereof, heating a plurality of opposing separate portions of said first and second parts along said lengthwise direction where said first and second parts are overlapped to form at least one pair of corresponding melted portions on both said first and second parts, each said pair of melted portions respectively separated in said lengthwise direction by a non-melted portion, and pressing said opposing melted portions together to weld said opposing melted portions together by solid welds with said non-welded portion respectively existing between each said pair of said welded portions in said lengthwise direction, wherein said welded portions extend across a width of said band, and said non-welded portion has a length in said lengthwise direction of said band at least equal to a thickness of said band and less than or equal to twice said width of said band.

2. The method according to claim 1, wherein said heating is carried out by interposing a heating plate between said first and second parts.

3. The method according to claim 2, wherein said heating plate is removed after said melting of said pair of melted portions and before said pressing.

4. The method according to claim 1, wherein said heating and pressing are carried out by pressing a vibrating plate on said first and second parts while maintaining said first and second parts in close contact with each other, vibrating said vibration plate and melting said opposing separated portions of said first and second parts by frictional heating, and then stopping said vibrating.

5. The method according to claim 1, wherein said solid welds are flat.

6. The method according to claim 1, wherein said pressing is at a pressure of less than 30 kg/cm².

7. A method for welding a packing band of stretched thermoplastic resin having a flat cross section which comprises the steps of:

overlapping a first part and second part of the band in a lengthwise direction thereof, heating a plurality of opposing separate portions of said first and second parts along said lengthwise direction where said first and second parts are overlapped to form at least one pair of melted portions on both said first and second parts, each said pair of melted portions respectively separated in said lengthwise direction by a non-melted portion, and pressing said opposing melted portions together to weld said opposing melted portions together by solid welds, so that said at least one pair of melted portions on said first part is respectively welded to said at least one pair of melted portions on said second part with said non-welded portion respectively existing between each said pair of welded portions in said lengthwise direction, wherein said welded portions extend across a width of said band, and said non-welded portion has a length in said lengthwise direction of said band at least equal to a thickness of said band and less than or equal to twice said width of said band.

* * * * *